July 21, 1964 H. W. MILNES 3,141,966
BINARY COUNTER CIRCUIT
Filed March 2, 1961
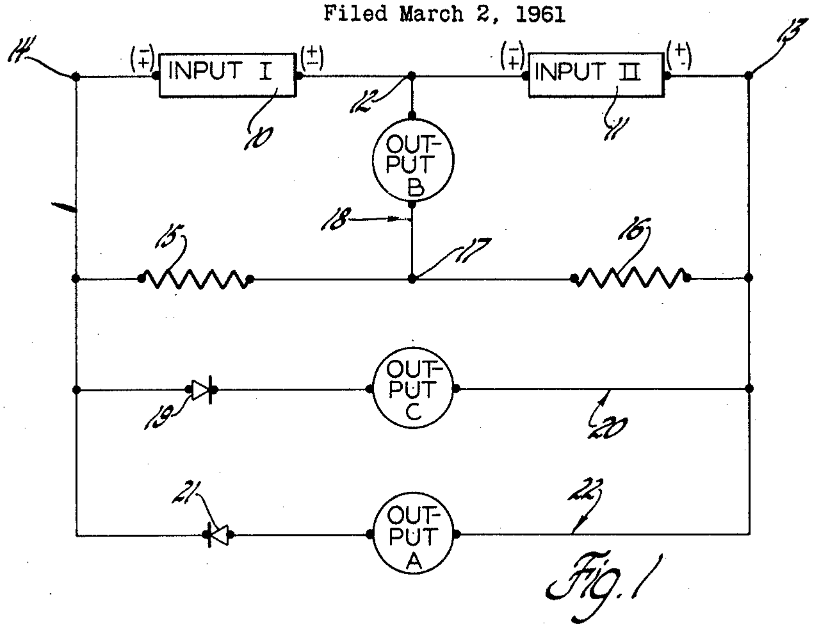
Fig. 1
| INPUT | | OUTPUT | | |
|---|---|---|---|---|
| I | II | A | B | C |
| – | – | ON | OFF | OFF |
| + | – | OFF | ON | OFF |
| – | + | OFF | ON | OFF |
| + | + | OFF | OFF | ON |
Fig. 2
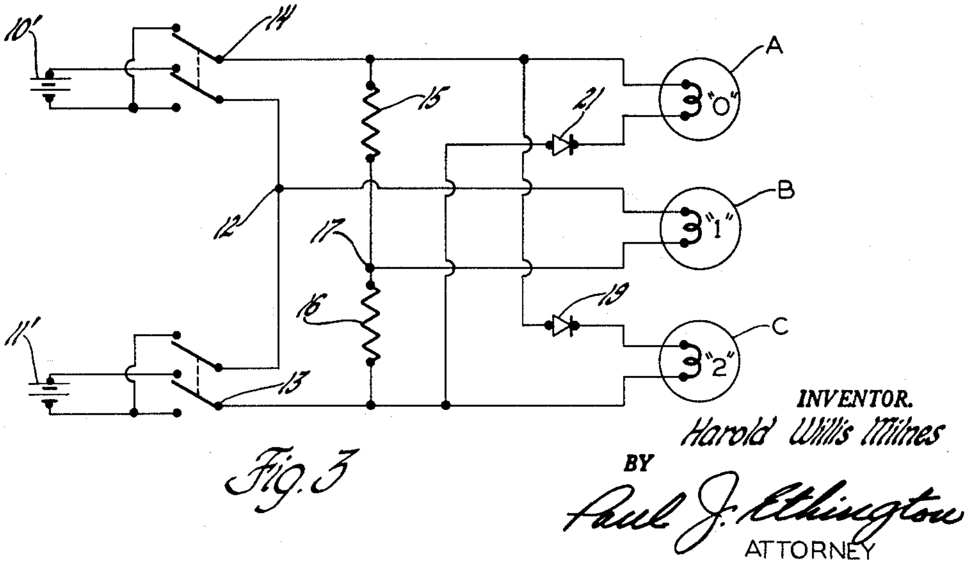
Fig. 3
INVENTOR.
Harold Willis Milnes
BY
Paul J. Ethington
ATTORNEY

United States Patent Office 3,141,966

Patented July 21, 1964

3,141,966
BINARY COUNTER CIRCUIT

Harold Willis Milnes, Detroit, Mich., assignor to General Motors Corporation, Detroit, Mich., a corporation of Delaware Filed Mar. 2, 1961, Ser. No. 92,877
5 Claims. (Cl. 235—179)

This invention relates to a binary counter circuit and more particularly to a circuit to perform an arithmetic operation on a binary code.

The purpose of this invention is to provide a condition responsive circuit for accepting input information at two stations and to convert this to output information at one of three output stations.

The invention is carried out by providing a pair of equal reversible voltages in series with a pair of unilateral parallel output circuits either one of which conducts current when the input voltages are additive and a third output circuit connected between the input sources which conducts current when the input voltages are bucking.

The above and other advantages will be made more apparent from the following specification taken in conjunction with the accompanying drawings wherein FIGURE 1 is a schematic electrical diagram of a binary counter circuit according to the invention, FIGURE 2 is a table indicating the output responsive to different combinations of input signals of the circuit of FIGURE 1, and FIGURE 3 is a schematic electrical diagram showing a specific application of the circuit of FIGURE 1.

Referring to the drawings, FIGURE 1 shows a circuit including two input stations 10 and 11 connected in series so as to have a common terminal 12 and external terminals 13 and 14. The input stations 10, 11 comprise voltage sources of equal magnitude but are independently reversible in polarity.

A first output circuit 18 includes two resistors 15 and 16 and output station B. Resistors 15 and 16 are of equal magnitude and are series connected across the terminals 13 and 14 of the input stations. The resistors 15 and 16 have a common terminal 17 and output station B is connected between the common input terminal 12 and the common resistor terminal 17 so as to form a bridge circuit with the input stations 10 and 11 and resistors 15 and 16. Between the input terminals 13 and 14 is a second output circuit 20 including a rectifier 19 in series with an output station C. A third output circuit 22 is also connected between terminals 13 and 14 and comprises an output station A in series with a rectifier 21 having the opposite polarity of rectifier 19. Each output station is a device for indicating or recording the event of current passing therethrough.

For purposes of discussion, let a "negative" input voltage be one which tends to lower the potential of terminal 14 with respect to terminal 13 and similarly let a "positive" input voltage be one which tends to raise the potential of terminal 14 with respect to terminal 13. In operation, when the input voltages are both negative so that terminal 13 is positive and terminal 14 is negative with respect to terminal 12, current will flow through the third output circuit 22, thereby causing output station A to register. Current will not pass through the second output circuit due to the polarity of rectifier 19. Current will flow through the resistors 15 and 16 but since the bridge circuit is balanced the voltage at terminals 12 and 17 will be equal so that there will be no current flow through output station B. When both of the input voltages are positive so that terminal 14 is positive and terminal 13 is negative with respect to terminal 12, then current will flow through the output circuit 20, but not through output circuit 22 and since the bridge is balanced, there will be no current flow through output station B; thus only station C will register. However, in the case when the input voltages are opposite in polarity so that, for example, terminals 13 and 14 are positive with respect to the common terminal 12, then there will be no current flow through the second or third output circuits because terminals 13 and 14 are of equal potential. The bridge circuit will be unbalanced so that current will flow in opposite directions through resistors 15 and 16 toward terminal 17 and through output station B to common terminal 12, thereby causing the output station B to register. Similarly when the input polarities are such that terminals 13 and 14 are negative with respect to common terminal 12, only output 18 will register. This information is tabulated in FIGURE 2.

The specific form of the circuit shown in FIGURE 3 is identical to that of FIGURE 1 except that each input 10 and 11 is replaced by a battery 10′ or 11′ connected to terminals 12, 13 and 14 through reversible switches while the output stations A, B and C take the form of lamps. In the application to a binary counter the circuit may be used to convert electrical binary code to a visible output by assigning the value of zero to a negative input voltage with respect to, say, terminal 14 and the value of one to a positive input voltage, then the cumulative effects of the voltages may be interpreted as being the numerals "0," "1" or "2" depending upon which lamp is energized. For example, when both input signals are negative so that terminal 14 is negative, lamp A will be energized in accordance with the above description. This lamp then will be assigned the value of "0" since both of the negative inputs correspond to zero values and their sum is zero. On the other hand, when both of the inputs are positive with respect to terminal 14, then lamp C will be energized. Since the positive signals are each of the value of 1, and 1+1=2, the lamp C will be assigned the value "2." For the case where the input voltages are of opposite polarity, the lamp B is energized and will have the value of "1" since the opposite input signals correspond to 1+0 or 0+1, and the sum is "1." For example, in FIGURE 3 the switches are positioned so that the battery 10′ has its negative terminal connected to terminal 14 thus providing a signal of "0" and battery 11′ similarly is negative with respect to terminal 14 and also provides a signal of "0." Current then flows in lamp A to indicate the total which is "0."

It is to be appreciated that the invention is not limited to use as a readout device but may be used in intermediate stages of a computer. One suggested use is that several such circuits be connected in cascade so that the output of one provides the input to the next thus forming a more complex adding circuit.

It is understood that the circuit may depart somewhat from the embodiment disclosed herein while remaining within the scope of the invention which is limited only by the following claims.

I claim:

1. A bridge circuit including first and second voltage sources in adjacent arms thereof, at least one of said sources being reversible in polarity in response to a condition, a pair of like resistors comprising the remaining arms of said bridge, a first output circuit connected between a terminal of said bridge wherein said sources are joined and a terminal wherein said resistors are joined, and a second output circuit connected across the remaining terminals of said bridge.

2. A bridge circuit including first and second voltage sources in adjacent arms thereof, each of said sources being reversible in polarity in response to a condition, a pair of like resistors comprising the remaining arms of said bridge, a first output device connected between a terminal of said bridge wherein said sources are joined and a terminal wherein said resistors are joined, and second and third output devices connected across the remaining terminals of said bridge, each of said second and third output devices being conductive in one direction only.

3. A binary counting circuit for adding conditions corresponding to "0" and "1" to produce their sum comprising a pair of equal voltage sources having reversible polarities corresponding to said conditions, said sources being connected in series, a pair of series connected equal resistors in parallel with said sources, a pair of unidirectional conducting output devices connected across said voltage sources and, an output device connected between the juncture of the sources and the juncture of the resistors, wherein one of the output devices will be energized thereby indicating said sum.

4. An electrical circuit comprising a pair of input sources having a common terminal and presenting first and second input terminals, resistance means connected between said first and second input terminals and having a center terminal, first output means connected between said center terminal and said common terminal, second output means having unidirectional current flow characteristics and being connected between said first and second input terminals, and third output means having unidirectional current flow characteristics and being connected between said first and second input terminals.

5. Condition responsive means including a first voltage source of a given magnitude and having reversible polarity; a second voltage source of said given magnitude and having reversible polarity, said voltage sources being connected in series between a first and a second input terminal, first and second resistors of equal magnitude connected in series between said first and second input terminals, a first current responsive device connected between the juncture of said first and second resistors and the juncture of said first and second voltage sources, a second current responsive device connected between said first and second input terminals and responsive to current flow in one direction, and a third current responsive device connected between said first and second input terminals and responsive to current flow in the opposite direction.

References Cited in the file of this patent

UNITED STATES PATENTS

| | | |
|---|---|---|
| 2,520,428 | Nilakantan | Aug. 29, 1950 |
| 2,587,193 | Miller | Feb. 26, 1952 |